US012707388B2

(12) United States Patent
Yamine et al.

(10) Patent No.: US 12,707,388 B2
(45) Date of Patent: Aug. 11, 2026

(54) METHOD FOR SWITCHING OFF NETWORK CELLS BASED ON THE CAPABILITY OF WIRELESS DEVICES IN THE NETWORK

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 18/556,245

(22) PCT Filed: May 10, 2021

(86) PCT No.: PCT/SE2021/050437

§ 371 (c)(1),
(2) Date: Oct. 19, 2023

(87) PCT Pub. No.: WO2022/240320

PCT Pub. Date: Nov. 17, 2022

(65) Prior Publication Data

US 2024/0196325 A1 Jun. 13, 2024

(51) Int. Cl.
*H04W 52/02* (2009.01)
*H04W 36/32* (2009.01)

(52) U.S. Cl.
CPC ..... *H04W 52/0219* (2013.01); *H04W 36/324* (2023.05)

(58) Field of Classification Search
CPC ........................ H04W 52/0219; H04W 36/324
See application file for complete search history.

(56) References Cited

U.S. PATENT DOCUMENTS

| | | | |
|---|---|---|---|
| 2007/0066329 A1 | 3/2007 | Laroia et al. | |
| 2017/0187595 A1 | 6/2017 | Tinnakornsrisuphap | |
| 2020/0389842 A1* | 12/2020 | Zhu | H04W 24/02 |

FOREIGN PATENT DOCUMENTS

| | | |
|---|---|---|
| WO | 2010123417 A1 | 10/2010 |
| WO | 2016134676 A1 | 9/2016 |
| WO | 2017162399 A1 | 9/2017 |

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

(Continued)

*Primary Examiner* — Gbemileke J Onamuti
(74) *Attorney, Agent, or Firm* — Sage Patent Group

(57) ABSTRACT

There is disclosed a method at a wireless device (102) in a wireless communication network (100, 200). The wireless device is located in a first geographical area associated with a first cell (103*a*, 203*a*). The first cell is operated by a first network node (101*a*, 201, 301*a*) according to a first cell configuration. The wireless device supports at least the first cell configuration. The method comprising receiving (401), from the first network node, cell information indicating whether a second cell (103*b*, 203*b*) is switched off. The second cell is associated with a second cell configuration. The method further comprising transmitting (403), to the first network node, capability information indicating whether the wireless device supports the second cell configuration. The disclosure also pertains to related devices and methods.

19 Claims, 13 Drawing Sheets

(56) References Cited

OTHER PUBLICATIONS

Huawei, et al., "CR on small cell on/off for Small cell enhancements", 3GPP TSG RAN WG1 R1-136052, San Francisco, USA, Nov. 11-15, 2013, 1-27.

3GPP, "3GPP TS 36.331 V16.1.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1078.

3GPP, "3GPP TS 36.331 V16.1.1", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1078.

* cited by examiner

200

METHOD FOR SWITCHING OFF NETWORK CELLS BASED ON THE CAPABILITY OF WIRELESS DEVICES IN THE NETWORK

TECHNICAL FIELD

This disclosure pertains to wireless communication, and in particular to energy saving in wireless communication networks.

BACKGROUND

As the number of connected devices grows rapidly, and the network traffic is expected to provide these devices with more and more data, the energy consumption of wireless communication networks is increasing. Therefore, energy efficiency of wireless communication networks is gaining more interest.

One way to save energy is to switch off the wireless devices, which could save both energy at the network side and battery consumption at the wireless devices. However, the possibility of switching off network nodes, such as for example base stations, is a more practical and efficient way to improve the network energy efficiency.

While switching off a wireless device may impact the user of that wireless device, switching off network nodes may potentially affect several users in the network.

Therefore, there is a need for improved methods for reducing network energy consumption.

SUMMARY

It is an object of the present disclosure to address one or more of the above mentioned issues.

In some of the embodiments of this disclosure, cells are switched on/off based on the capability of wireless devices in the network. The switching on/off of the cells takes into consideration if wireless devices will be negatively affected by that switch-off procedure.

There is disclosed a method at a wireless device in a wireless communication network. The wireless device may be located in a first geographical area. The first geographical area may be associated with a first cell. The first cell may be operated by a first network node according to a first cell configuration. The wireless device may support at least the first cell configuration. The method may comprise receiving cell information. The cell information may be received from the first network node. The cell information may indicate whether a second cell is switched off. The second cell may be associated with a second cell configuration. The method may further comprise transmitting capability information. The capability information may be transmitted to the first network node. The capability information may indicate whether the wireless device supports the second cell configuration.

The wireless device may, for example, transmit the capability information for assisting the first network node or a second network node in deciding whether the second cell is to be switched on or off.

There is disclosed a method at a first network node in a wireless communication network. The wireless communication network may comprise a wireless device. The method may comprise obtaining cell information. The cell information may indicate whether a second cell is switched off. The second cell may be associated with a second cell configuration. The method may further comprise obtaining capability information. The capability information may indicate whether the wireless device supports the second cell configuration. The wireless device may be located in a first geographical area. The first geographical area may be associated with a first cell. The first cell may be associated with a first cell configuration. The wireless device may support at least the first cell configuration.

The method may further comprise deciding whether the second cell is to be switched on or off. The deciding may be based on the obtained cell information and capability information. Additionally or alternatively, the method may comprise signaling the capability information to a second network node. The capability information may be for the second network node to decide whether the second cell is to be switched on or off.

There is disclosed a wireless device configured for use in a wireless communication network. The wireless device may be configured to perform any of the methods at the wireless device described above. The wireless device may be implemented as a user equipment or a terminal. The wireless device may comprise, and/or be adapted to utilize, processing circuitry and/or radio front-end circuitry, in particular a transceiver and/or transmitter and/or receiver, for example for communicating with one or more network node(s).

There is disclosed a network node configured for use in a wireless communication network. The network node may be configured to perform any of the methods at the first network node described above. The network node may comprise, and/or be adapted to utilize, processing circuitry and/or radio front-end circuitry, in particular a transceiver and/or transmitter and/or receiver, for example for communicating with a wireless device and/or other network node(s).

Certain embodiments may provide that cells with an associated cell configuration may be switched on/off (for instance to save energy) without affecting wireless devices in the wireless communication network. The switching on/off may be based on the capability of the wireless devices.

Generally, all terms used are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

Some of the embodiments contemplated herein will now be described more fully with reference to the accompanying drawings. Embodiments are provided by way of example to convey the scope of the subject matter to those skilled in the art.

In the following, concepts and approaches are described in the context of e.g. NR or LTE technology. However, the concepts and approaches may be applied to other Radio Access Technologies (RATs). Moreover, the concepts and approaches are discussed in the context of communication between network nodes (e.g. gNBs, eNBs, or Base Stations (BS)) and a wireless device (e.g. User Equipment, UE), for downlink and uplink subject transmission but may also be applied to a sidelink scenario, in which the involved network nodes may be wireless devices.

Figure 1:
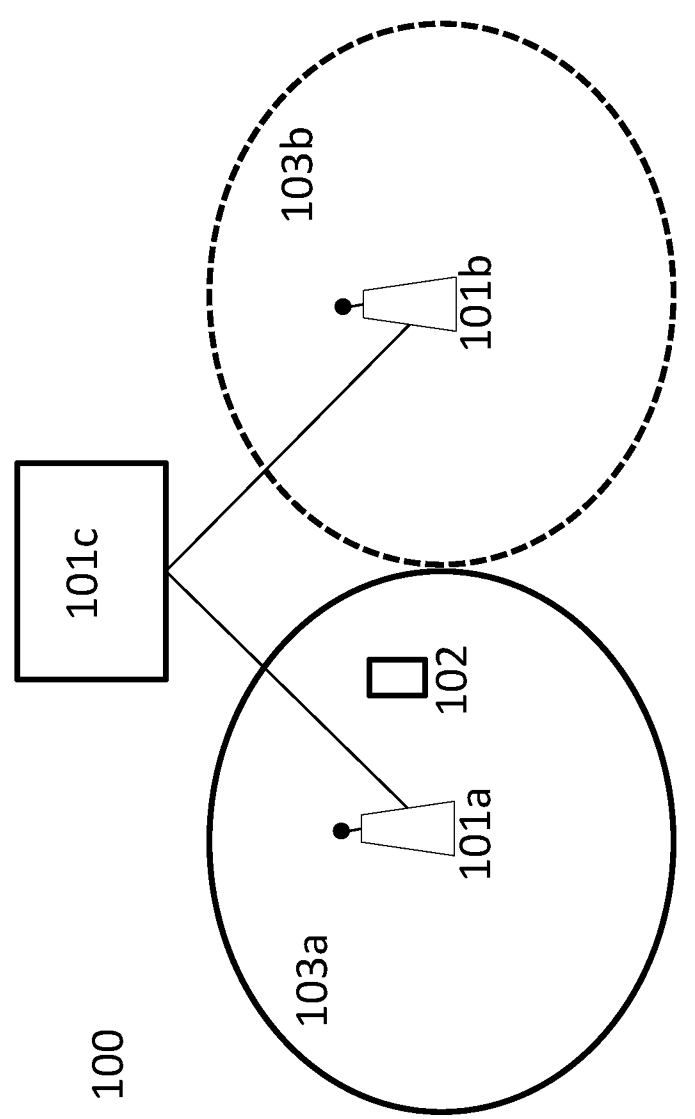
FIG. 1 illustrates a wireless communication network in accordance with some embodiments.

FIG. 1 shows one example of a wireless communication network 100. In this example, the wireless communication network 100 comprises two cells 103*a* and 103*b*, each being operated by a respective network node 101*a* and 101*b*. The cells 103*a*, 103*b* may be associated with different cell configuration, for example the first cell 103*a* is operated by the first network node 101*a* according to 3G, while the second cell 103*b* is operated by the second network node 101*b* according to 4G. In this example, there is also a third network node 101*c*, which is communicating with the first and second network nodes 101*a*, 101*b*. The third network node 101*c* may for instance be part of an Operations Support System (OSS), and may be responsible for controlling the switching on/off of the first and/or the second cell(s) 103*a*, 103*b*. It will be appreciated that the communication network 100 may for example comprise additional cells and network nodes not shown in FIG. 1.

In the example given in relation to FIG. 1, the second cell 103*b* is switched off, for instance to reduce energy at the second network node 101*b*. This is, in FIG. 1, illustrated by the dashed line of the second cell 103*b*. A wireless device 102 may be located within the first cell 103*a*. The wireless device 102 may in this example support both 3G and 4G and hence supports both the first cell 103*a* and the second cell 103*b*. There may be no other cells, or there may only be cells which the wireless device 102 does not support, covering the same geographical area as the second cell 103*b*. For instance, a 5G cell (not shown in FIG. 1) may cover at least a part of the second cell 103*b*. However, the second cell 103*b* is switched off, and the wireless device 102 may not support 5G. Therefore, the wireless device 102 may not be able to communicate with the network 100 if it moves from the first cell 103*a* into the second cell 103*b*. This may be overcome in case the second cell 103*b* is switched on. Hence if the second cell 103*b* is not switched on, this may lead to a dropped call or that the wireless device 102 may not be able to perform a call.

The wireless device 102 may be unaware of that the second cell 103*b* is switched off and that if the wireless device 102 moves away from the first cell 103*a* it may not be able to communicate. Further, if the wireless device 102 is in connected mode, it may have signaled its capabilities to the first network node 101*a* during for instance a connection setup. However, if the wireless device 102 is in idle mode, the first network node 101*a* may not be aware of that the wireless device 102 is located within the first cell 103*a* and whether this wireless device 102 supports the second cell 101*b*, which is switched off.

Therefore, the network nodes may exchange cell information indicating whether any cells are switched off. In the example of FIG. 1, the second cell 103*b* is switched off, and the first network node 101*a* may obtain this cell information. The cell information may for instance be received from the third network node 101*c*, which may be responsible for switching on/off the second cell 103*b*. The first network node 101*a* may broadcast the cell information in the first cell 103*a* to inform the wireless devices located within the first cell 103*a* that the second cell 103*b* is switched off. The wireless device 102 will receive the cell information and may in response transmit capability information to the first network node 101*a*. In this example the capability information indicates that the wireless device 102 supports 4G and hence that it supports the second cell 103*b*. The first network node 101*a* may forward this capability information to the third network node 101*c*. The third network node 101*c* may in turn decide whether the second cell 103*b* should be switched on to support the wireless device 102. In this way, the network (for example one of the network nodes 101*a*-*c*) may be able to make the decision before the wireless device 102 leaves the first cell 103*a*, so that when wireless device 102 moves to the second cell 103*b*, the second cell 103*b* may be switched on.

It will be appreciated that the cell and/or capability information may be represented in different ways depending on whether they are signaled between two network nodes or between a network node and a wireless device. It will be appreciated that the decision of whether the second cell 103*b* should be switched on may be taken by any of the network nodes 101*a*-*c*.

In a case where the second cell 103*b* is switched on to support the wireless device 102, but the wireless device 102 remains in the first cell 103*a*, switching on the second cell 103*b* may be useless and unnecessary energy may be used. Therefore, the decision whether the second cell 103*b* is to be switched on may further be based on one or more conditions. One condition may be that when the wireless device 102 is close to the cell edge of the first cell 103*a*, or when the wireless device 102 is moving towards the second cell 103*b*, the second cell 103*b* is switched on.

Figure 2:
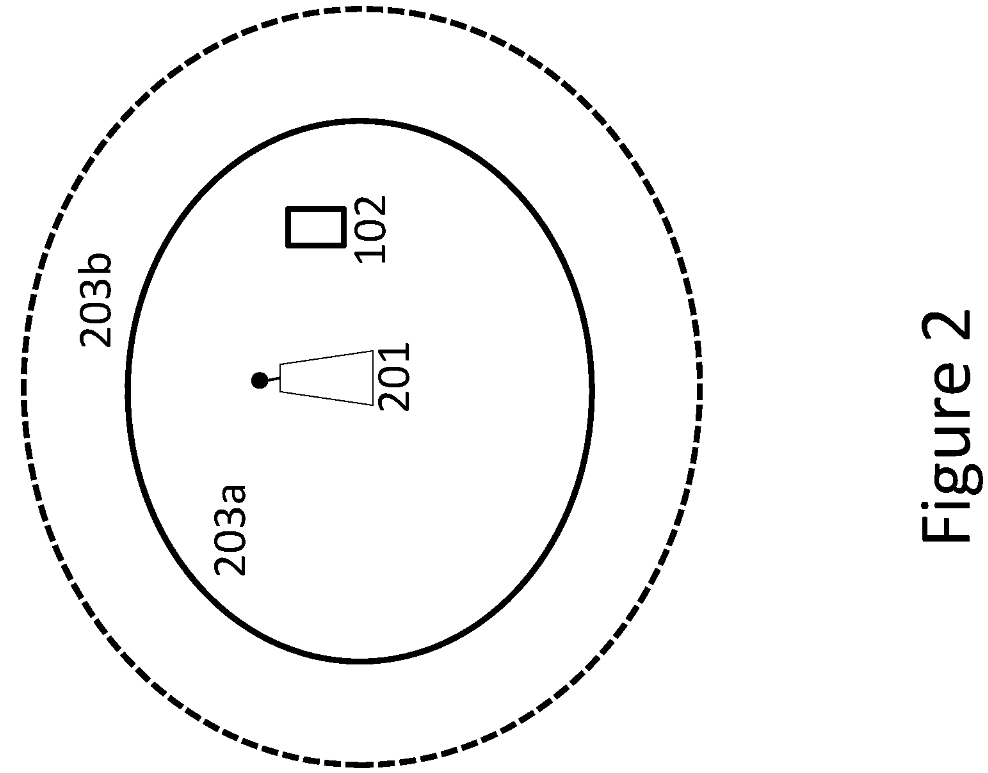
FIG. 2 illustrates a wireless communication network in accordance with some embodiments.

FIG. 2 shows another example of a wireless communication network 200. In this example, the wireless communication network 200 comprises two cells 203*a*, 203*b*, being operated by the same network node 201. The cells 203*a*. 203*b* may be associated with different cell configuration, for example the first cell 203*a* is operated by the network node 201 according to 3G, while the second cell 203*b* is operated by the network node 201 according to 4G. In this example, the network node 201 may be responsible for controlling the switching on/off of the first and/or the second cells 203*a*, 203*b*. It will be appreciated that the communication network 200 may for example comprise additional cells and network nodes not shown in FIG. 2.

In the example given in relation to FIG. 2, the second cell 203*b* is switched off, which is illustrated by the dashed line of the second cell 203*b*. A wireless device 102 may be located within both the first and the second cell 203*a*, 203*b*. The wireless device 102 may in this example support both 3G and 4G and hence supports both the first cell 203*a* and the second cell 203*b*. In this example, the second cell 203*b* covers a larger geographical area than the first cell 203*a*. Since the second cell 203*b* is switched off, the wireless device 102 may not be able to communicate with the network 200 if it moves outside a geographical area covered by the first cell 203*a* to a geographical area only covered by the second cell 203*b*.

In the example of FIG. 2, the network node 201 may already be aware of that the second cell 203*b* is switched off, and therefore, there is no need for any exchange of cell information between any network nodes. Instead, the cell information can be obtained internally at the network node 201. The network node 201 may broadcast the cell information in the first cell 203*a* to inform the wireless devices located within the first cell 203*a* that the second cell 203*b* is switched off. The wireless device 102 will receive the cell information and may in response transmit capability information to the network node 201. In this example the capability information indicates that the wireless device 102 supports 4G and hence that it supports the second cell 203*b*. The network node 201 may then decide whether the second cell 203*b* should be switched on to support the wireless device 102. It will be appreciated that the decision of whether the second cell 203*b* should be switched on may be taken by another network node than network node 201.

Figure 3:
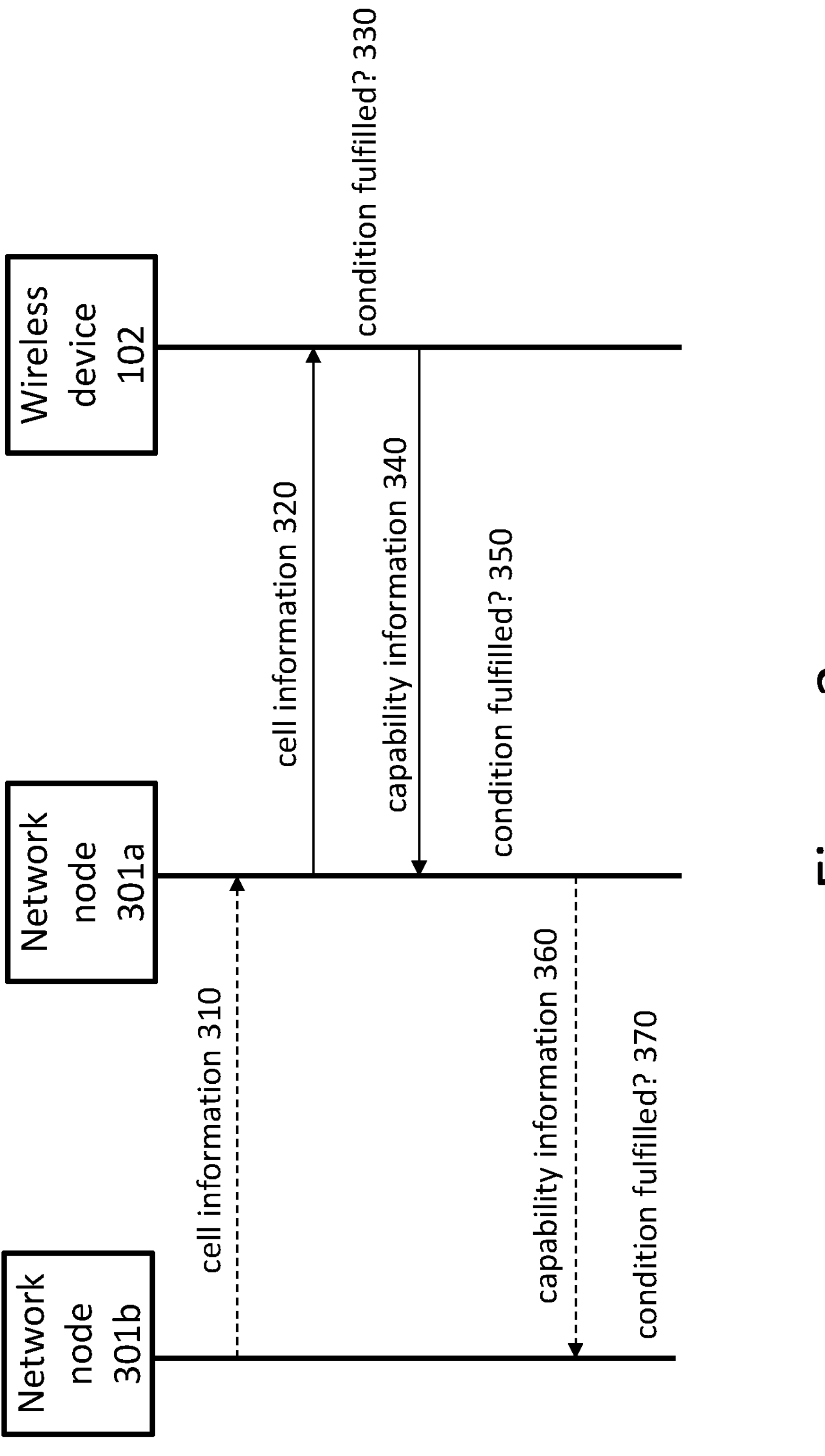
FIG. 3 is a signaling scheme illustrating the signaling performed in accordance with some embodiments.

FIG. 3 is a signaling scheme illustrating the signaling performed between a first network node 301*a*, a second network node 301*b*, and a wireless device 102 according to some embodiments disclosed herein. The wireless device 102 may receive 320 cell information signaled from the first network node 301*a*. The first network node 301*a* may have obtained the cell information by itself, or optionally (as indicated by the dashed line) the first network node 301*a* may in turn have received 310 the cell information from the second network node 301*b*. The network nodes 301*a* and 301*b* may be directly connected or connected via further network nodes, and the connection may involve wireless and/or wired communication. The cell information may be represented in different ways depending on whether it is signaled between two network nodes, or between a network node and a wireless device.

The wireless device 102 may transmit 340 capability information to the first network node 301*a*. The capability information may be transmitted 340 based on a condition being fulfilled 330. The condition 330 may in some cases be that the cell information is received. The condition 330 may, alternatively, and/or additionally, involve one or more other conditions 330.

In some examples, the first network node 301*a* may optionally decide to switch on/off a second cell based on the received 340 capability information, and possibly one or more further conditions being fulfilled 350. The first network node 301*a* may for instance decide to switch on/off the second cell if it controls the switching on/off of the second cell and/or operates the second cell.

Alternatively, the first network node 301*a* upon reception 340 of the capability information may optionally (as indicated by a dashed line) forward 360 the capability information to the second network node 301*b*. The forwarding 360 may be conditional, for example based on that a condition is fulfilled 350. The condition 350 may for instance be that the capability information is received, or for instance that the capability information indicates that a wireless device 102 supports a cell, which according to the cell information is indicated as switched off. Upon reception 360 of the capability information, the second network node 301*b* may decide to switch on/off a second cell based on the received 360 capability information, and possibly one or more further conditions being fulfilled 370. The network node 301*b* may decide this if it for example controls the switching on/off of the second cell and/or for example operates the second cell. The capability information may be represented in different ways depending on whether it is signaled between two network nodes, or between a network node and a wireless device.

The conditions 330, 350, 370 may be based on further signaling, such as for example measurements on signaling from the first network node 301*a*, signaling from the wireless device 102, measurement reports signaled from the wireless device 102, and/or signaling between the network nodes 301*a*, 301*b*. This signaling has been omitted for clarity from FIG. 3, but it will be appreciated that such different signaling may be present.

Figure 4:
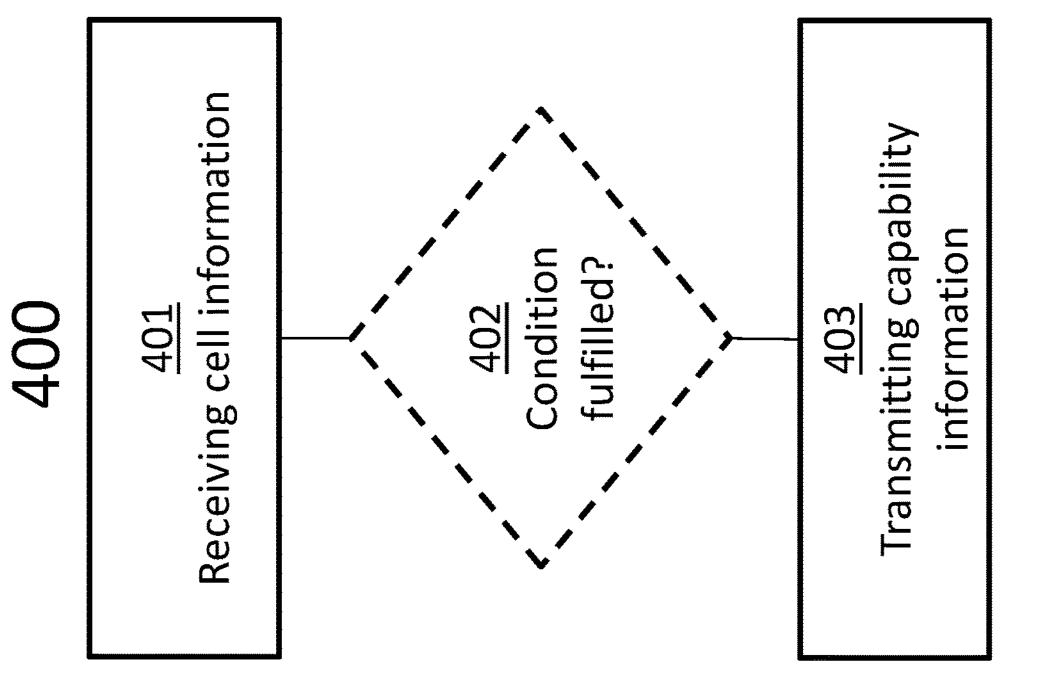
FIG. 4 is a flowchart illustrating a method at a wireless device in accordance with some embodiments.

FIG. 4 is a flowchart illustrating a method 400. The method 400 may for example be performed by, or at, a wireless device in a wireless communication system, in accordance with some embodiments. The wireless device may be located in a first geographical area associated with a first cell, wherein the first cell may be operated by a first network node according to a first cell configuration. The wireless device supports at least the first cell configuration. The method 400 may for example be performed by, or at, the wireless device 102 shown in FIGS. 1-3, and it will be appreciated that some features and/or examples given in relation to FIGS. 1-3 may correspond to features, examples, and/or embodiments given in relation to method 400 of FIG. 4.

The method 400 may comprise receiving 401 cell information indicating whether a second cell may be switched off. The second cell may be associated with a second cell configuration. The cell information may be received from the first network node.

The method 400 may further comprise transmitting 403 capability information, where the capability information indicates whether the wireless device supports the second cell configuration. The capability information may be transmitted to the first network node.

The method 400 may for instance be performed by, or at, the wireless device 102 described above with reference to FIGS. 1-3. According to the examples given in relation to FIGS. 1-2, the wireless device 102 may be located in the geographical area associated with the first cell 103*a* or 203*a*. These cells may be operated by any of the exemplified first network nodes 101*a*, 201, 301*a*. The cell information received by the wireless device 102 at step 401 may indicate that the second cell (for example the cell 103*b* in FIG. 1 or the cell 203*b* in FIG. 2) is switched off, where in these examples the second cell is associated with the cell configuration 4G. When the wireless device 102 receives 401 the cell information, for example indicating that the second cell is switched off, the wireless device 102 may want to inform the first network node about its presence and its capability. At step 403, the wireless device 102 may transmit its capability information to the first network node informing the first network node that the wireless device 102 supports the cell configuration (for example 4G) and hence supports the second cell.

In some embodiments the capability information may be transmitted 403 by the wireless device for assisting the network in deciding whether the second cell (for example the cell 103*b* in FIG. 1 or the cell 203*b* in FIG. 2) is to be switched on or off. For instance, when the second cell is switched off and the wireless device supports that cell, the network (for example one of the network nodes in the network such as the first, or the second, or any other network node) may decide that the second cell should be switched on to support the wireless device. It will be appreciated that there may exist situations where the network decides that the second cell should remain or be switched off.

It will be appreciated that the decision whether the second cell is to be switched on/off may be taken by different network nodes. For instance, if the first network node referred to in the method 400 controls the switching on/off of the second cell, the decision may be performed by the first network node (for example the first network node 101*a*, 201, 301*a* in the examples of FIGS. 1-3). The decision may also be performed by a second network node, for instance one of the network nodes 101*b-c*, 301*b* in the examples of FIGS. 1-3.

The first network node referred to in the method 400 may for example comprise a first and a second base station. The first base station may operate the first cell according to the first cell configuration. The second base station may operate the second cell according to the second cell configuration. For instance, in the example given in relation to FIG. 2, the network node 201 may comprise a first and second base station each operating the corresponding first and second cell 203*a*, 203*b*. Since the network node 201 may operate both the first and the second cell 203*a*. 203*b*, it may also control the switching on/off of the first and second cells 203*a*, 203*b* without involving any further network nodes. However, it will be appreciated that for the example in FIG. 2, the switching on/off of the first and second cells may be controlled by another network node even when the first network node operates both the first and second cell.

The second network node (for example the network node 101*b* in FIG. 1) may be connected to the first network node (for example the network node 101*a* in FIG. 1) directly or via one or more other network nodes (for example the network node 101*c* in FIG. 1). The second network node may comprise a second base station which operates the second cell according to the second cell configuration, such as for example the network node 101*b* in FIG. 1. The second network node may also be a node which does not comprise any base station (for example the network node 101*c* in FIG. 1), instead the second network node may be configured to control the switching on/off of the second cell for example by informing the network node operating the second cell that the cell should be switched off.

In some embodiments the capability information may be transmitted 403 in response to that the cell information (received at step 401) indicates that the second cell is switched off and the wireless device supports the second cell configuration. For example, if the wireless device is idle, the first network node may not be aware of the presence of the wireless device in the first geographical area (for example the geographical area associated with the cell 103*a* in FIG. 1 or the cell 203*a* in FIG. 2). Therefore, the wireless device, in idle mode, which receives 401 the cell information indicating that the second cell is switched off may want to inform the first network node of its presence and of its capabilities. This may only be relevant in case the wireless device supports the second cell. If the wireless device does not support the second cell, it may ignore the cell information received at step 401. The wireless device may at some point want to connect to the second cell, which may not be possible as long as the second cell is switched off.

The second cell referred to in the method 400 may be associated with a second geographical area (for example the geographical area associated with the cell 103*b* in FIG. 1 or the cell 203*b* in FIG. 2). At least a portion of the second geographical area may be outside the first geographical area (for example the geographical area associated with the cell 103*a* in FIG. 1 or the cell 203*a* in FIG. 2), so the wireless device may not be covered there by the first cell. The cell information received at step 401 may indicate that the second cell is switched off and the capability information transmitted at step 403 may indicate that the wireless device supports the second cell configuration. If the wireless device moves to this portion of the second geographical area, it needs to rely on other cells than the second cell (which is switched off). In case there are no other cells covering the portion of the second geographical area, or if the only cells covering the portion of the second geographical area are not supported by the wireless device, the wireless device may end up without coverage. Hence, there may be at least a portion of the second geographical area in which the wireless device does not support a cell configuration of any cell that is switched on in the wireless communication network.

In some embodiments the capability information may be transmitted 403 based on a condition 402. The condition 402 may be optional, which is indicated by the dashed lines in FIG. 4. The condition 402 may include one or more things that may make the wireless device transmit 403 the capability information. It may only be relevant to transmit 403 the capability information in case the wireless device may access the second cell. Therefore, it may not be relevant to transmit 403 the capability information in case the wireless device does not support the second cell configuration. On the other hand, it may be relevant to transmit 403 the capability information if the likelihood of the wireless device moving to the second cell is high.

The condition 402 may include that the wireless device receives 401 the cell information. If the wireless device receives 401 the cell information, it may be an indication that the wireless device may transmit 403 the capability information to the first network node. This may be the case, for example if the second cell is indicated as being switched off and wireless device supports the second cell configuration. For example, the wireless device may transmit 403 the capability information directly when receiving 401 the cell information. In another example, the wireless device may receive 401 the cell information and wait for another condition 402 to be fulfilled (for instance that it is close to the cell edge of the first cell) before transmitting 403 the capability information. When the network is made aware of that the wireless device is located within the first geographical area and is made aware of its capabilities, the network may use this information to decide whether the second cell should be switched on.

It will be appreciated that the condition 402 may in some cases be based on an estimation, a determination and/or a measurement performed by the wireless device. The condition 402 may for instance be checked based on measuring signaling from the first network node and/or measuring signaling from other network nodes. The method 400 may therefore further involve receiving, determining, estimating, and/or measuring in order to determine whether the condition 402 is fulfilled. Further, the method 400 may also involve transmitting measurement reports to the first network node, such that the network may use this information along with the cell information and the capability information to decide whether the second cell should be switched on/off.

In some examples, the condition 402 may include that the wireless device is close to a cell edge of the first cell. If the wireless device is close to the cell edge of the first cell, this may be an indication that the wireless device may want to handover to and/or reselect the second cell and that the second cell should be switched on. However, if the wireless device is not close to the cell edge, switching on the second cell may be a waste of energy. In some examples, the condition 402 may include that a signal level of the first cell (as experienced/measured at the wireless device) is below a threshold. This may be an indication that the wireless device is close to the cell edge of the first cell and may want to handover to and/or reselect the second cell. In some example, the condition 402 may include that a signal level of the second cell (as experienced/measured at the wireless device) is above a threshold. This may be an indication that the wireless device is close to the second cell and may want to handover to and/or reselect the second cell. This is for instance depicted in relation to FIG. 1, where the wireless device 102 is close to the cell edge of the first cell 103*a* and therefore the signal level of the first cell may become lower, while the signal level of the second cell may become higher. It will be appreciated that even though the second cell is switched off, it may still perform some minimal synchronization signaling, which may be used by the wireless device to measure the signal level. The condition 402 may be related to that wireless device will soon lose coverage to the first cell and that the wireless device therefore may want to handover to and/or reselect the second cell. If the second cell is currently switched off, the second cell may be switched on to be able to support the wireless device if it moves out from the first cell. The condition 402 may include that a signal level of a third cell (as experienced/measured at the wireless device) is above a threshold. This may be an indication that the wireless device is close to the third cell and may be leaving the first cell. The condition 402 might occur when the coverage of the wireless device to the first cell has deteriorated under a certain threshold. An example of a signal level condition may be when the Reference Signal Received Power (RSRP) for the wireless device to the first cell <Threshold1 or, for example that the RSRP to the second/third cell> Threshold2/Threshold3, however, it is appreciated that other signal measurements may be used.

In some examples, the condition 402 may include that the wireless device is moving towards a geographical area associated with the second cell. This may for example be based on signal measurements on signaling from the first and/or other network nodes. For instance, if the signal level of the first cell to the wireless device is getting lower and lower, this may be an indication that the wireless device is moving away from the first cell. Additionally, and/or alternatively, the signal level of the second cell may become higher and higher. Also, different methods of measuring the position of the wireless device in the cell may be used, for example using Global Positioning Service (GPS), triangulation, and/or measurement fingerprinting etc.

In some examples, the condition 402 may include that the wireless device is predicted to move to a geographical area associated with the second cell. This may be based on historical measurements or estimated positions. This may be based on a prediction based on previous behavior of the wireless device. For instance, some wireless device may be predicted to move from a point A to a point B at an estimated time.

In some examples, the condition 402 may include that the wireless device is moving with a velocity above a velocity threshold. If the wireless device is moving at a high velocity, this may be an indication that the wireless device may lose coverage of the first cell and may want to handover to and/or reselect the second cell.

It will be appreciated that the condition 402 may comprise a combination of one or more of the conditions described above, which may be referred to as sub-conditions. If the condition includes multiple sub-conditions, all those sub-conditions should apply in order for the related action to be performed. An example may be that the wireless device transmits 403 the capability information based on both that the cell information is received 402 and that the wireless device is close to the cell edge of the first cell. These may or may not be closely related in time. The wireless device may have received 401 the cell information and then waits until it gets close to the cell edge before transmitting 403 the capability information. In this case, the wireless device will transmit 403 the capability information when both these has occurred. Other combinations will also be considered possible, for example based on a combination of a velocity of the wireless device and signal level measurements.

Throughout the present disclosure (for example in the embodiments described with reference to FIG. 1-5), a cell may be associated with a corresponding cell configuration, for instance by being operated by a network node according to that cell configuration. In some embodiments a cell configuration may comprise a RAT (for instance 3G, 4G, or 5G). In some embodiments, a cell configuration may comprise one or more of a RAT, a frequency, a set of frequencies, a frequency range, a frequency band, a set of frequency bands, an RF configuration, a set of RF configurations, a radio functionality and/or a set of radio functionalities associated with the cell.

The cell configuration may be a combination of one or more of these, for example a RAT and a frequency range. For example for 5G, the frequency bands are separated into two different frequency ranges FR1 and FR2, where FR1 includes sub-6 GHZ frequency bands and FR2 includes frequency bands from 24.25 GHZ to 52.6 GHZ, in this case the cell configuration may be 5G and FR1 and/or FR2. Another example of a cell configuration is that the cell configuration may comprise a RAT (for example 4G) and a radio functionality (for example Time and/or Frequency Division Duplex (TDD and/or FDD)). In some examples, the cell configuration may be changed, for example some functionalities may be switched on/off and/or some frequency bands may be switched on/off. For instance, a 5G-cell may use both FR1 and FR2, but may be configured to only use for example FR1 while FR2 may be switched off. In some other examples, the cell configuration may not be changed, and instead the cell configuration may be due to a physical limitation/restriction of the hardware of the network node. It will be appreciated that in at least some example scenarios, a cell configuration may not be reconfigured from one RAT to another, without replacing hardware components, or even replacing the entire network node.

A cell may be referred to as "switched off" for example when at least some service of the cell configuration of that cell is not available. This may be performed for example by an operator or via a Self Organizing Network (SON). A switched off cell may mean that at least some radio units of the network node operating that cell are switched off. The cell may also be switched off from the OSS, for example by locking via software. A cell may be switched off when a part of the cell configuration is switched off (for example one frequency band of a set of frequency bands). A cell may be switched off, for example to save energy. This may for example be done during low utilization periods (for example during the night). A cell may be pre-configured to be switched off with a predetermined interval (for example each night between 2 AM and 5 AM). A cell which is switched off may or may not perform some minimal signaling. For example, when a cell is switched off, the network node may signal some synchronization signaling, and may listen for wake-up signals. In this way, wireless device may in some examples measure the signal level for that cell even though the cell is switched off.

A geographical area may be associated with a cell, for instance by being covered by the cell. A geographical area associated with a cell may for example be the geographical area covered by the signaling of the network node which operates that cell according to the cell configuration. The geographical area associated with a cell may for example be the geographical area covered by the cell when the cell is switched on. The geographical area associated with a cell may for example be a part of the geographical area covered by the cell when the cell is switched on.

In some embodiments, the wireless device referred to in the method 400 (and/or the wireless device 102 shown in FIG. 1-3) may be connected to the first network node. In this case the wireless device may be in a connected mode of operation and may have performed a call setup procedure in which it has transmitted its capability information to the first network node. The connection setup procedure may be part of a Radio Resource Control (RRC) connection setup procedure. The capability information may be transmitted 403 prior to or after receiving 401 the cell information.

In some embodiments, the wireless device referred to in the method 400 (and/or the wireless device 102 shown in FIG. 1-3) and the first network node may not be connected. This may correspond to that the wireless device is in idle mode of operation. When the wireless device is in idle mode, the wireless device may not have performed a call setup procedure. In this case, the first network node may be unaware of the presence of the wireless device and its capabilities. The wireless device may receive 401 the cell information, which may be transmitted in for instance in a broadcast message. When the wireless device in idle mode receives 401 the cell information, it may transmit 403 its capability information to the first network node (for example based on a condition 402). In order to transmit 403 the capability information, the wireless device may perform a Tracking Area Update (TAU), or a call setup procedure, or a modified call setup procedure. If the wireless device performs the call setup procedure, the wireless device may transit from the idle mode of operation to a connected mode of operation. The modified call setup procedure may be a call setup procedure which is aborted (or discontinued) after the capability information is transmitted 403. By using the modified call setup procedure, the wireless device may transmit 403 the capability information and still remain in the idle mode of operation. The TAU may be a forced TAU procedure where the forced TAU procedure may involve that the wireless device triggers a TAU procedure before the periodic TAU timer has expired. During the TAU procedure, the wireless device may inform the network about its capability via for instance RRCConnectionSetupComplete.

In some embodiments the cell information received at step 401 may be transmitted from the first network node periodically, for instance with a certain periodicity. In some embodiments, the cell information may be transmitted from the network node in a System information message, which may be part of an RRC protocol which may be broadcasted on the air interface.

In some embodiments the second cell configuration referred to in the method 400 may be the same as the first cell configuration. For instance, both the first and the second cell configuration may be 3G, and hence the first and second cells may both be 3G-cells. In other embodiments the second cell configuration may be different than the first cell configuration. For example, the first cell may be a 3G-cell and the second cell may be 4G-cell, for example as illustrated in relation to FIGS. 1 and 2. In another example, the first and second cell configuration may use the same RAT (for example 5G) but different frequency ranges (for example FR1 and FR2).

In some embodiments, the first and second cell referred to in the method 400 may be located close to each other, for example the geographical areas associated with the cells may be physically close to each other. The first and second cell may be for instance neighboring cells, for example the geographical areas associated with the first and second cell may be partly overlapping, or adjacent or in proximity of each other. The first and second cell may be for instance at least partly overlapping cells, for example there may be a geographical area which is covered by both at least a portion of the first cell and at least a portion of the second cell. The first and second cell may be located in proximity of each other, where in proximity may be interpreted as located at most a certain distance from each other. The first and second cell may be located such that a handover from the first cell to the second cell is possible. The cells 103*a* and 103*b* in FIG. 1 may be referred to as neighboring cells since they are adjacent cells. The cells 203*a* and 203*b* in FIG. 2 may be referred to as neighboring cells since they are at least partly overlapping cells.

In some other embodiments, the first and second cell referred to in the method 400 may not be located close to each other. Instead, the first and second cell may be located a certain distance from each other. In this case, it may still be possible that the wireless device may move from the first cell to the second cell. This may for example be predicted based on previous behavior of the wireless device.

In some embodiments the capability information transmitted at step 403 may indicate a set of at least one cell configuration that the wireless device supports. The capability information may correspond to the capability information transmitted during the RRC connection setup procedure. The capability information may comprise a list of all cell configurations the wireless device supports. The capability information may for example indicate that the wireless device supports 3G and 4G, which may implicitly indicate that the wireless device does not support for example 5G. The capability information may comprise a list of all RATs, frequency bands, radio functionalities etc, that the wireless device supports. For example, the capability information may indicate that the wireless device supports 4G, 5G, TDD, Narrow band Internet-of-Things (NB-IOT), and FR1, which may imply that the wireless device supports for example the cell configurations 4G NB-IOT, 4G TDD, 4G NB-IOT TDD, and 5G FR1.

In some embodiments the cell information received at step 401 may indicate that a set of cells is switched off, wherein the set of cells includes the second cell. The set of cells may for instance comprise all cells in a proximity (for example within a certain distance) of the first cell which are switched off. In some embodiments the cell information received at step 401 may comprise at least one indicator. The indicator may indicate whether a cell (for example a certain 4G cell) is switched off. The indicator may indicate that one or more cells associated with a certain cell configuration (for example 4G) is switched off, which may be used to indicate to the wireless device that all cells (at least in a proximity of the first cell) using a certain cell configuration are switched off. The indication may comprise a parameter, for example denoted neighbor_cell_configuration_status. The parameter may be coded by a few (for example three) bits. Following are some examples of use of the parameter:

If the value is 001 it indicates that 3G is off (for example in one cell),

If the value is 010 that means n8 (5G operation band) is off (for example in another cell), If the value is 010 that means 4G is off (for example in yet another cell), If the value is 000 this means no neighbor cell is switched off.

In some embodiments, the cell information received at step 401 may comprise at least one cell identifier, wherein each cell identifier may identify a cell which is switched off. The cell information may comprise a cell identifier and an indicator. In this case, the indicator may be one bit indicating whether the cell related to that cell identifier is switched on or off. In vet another embodiment, the received 401 cell information may comprise a list of cells, where all cells in the list may be interpreted as being switched off. In this case, there is no need for an indicator. In some embodiments, the received 401 cell information may indicate the cell configuration of the cells.

Figure 5:
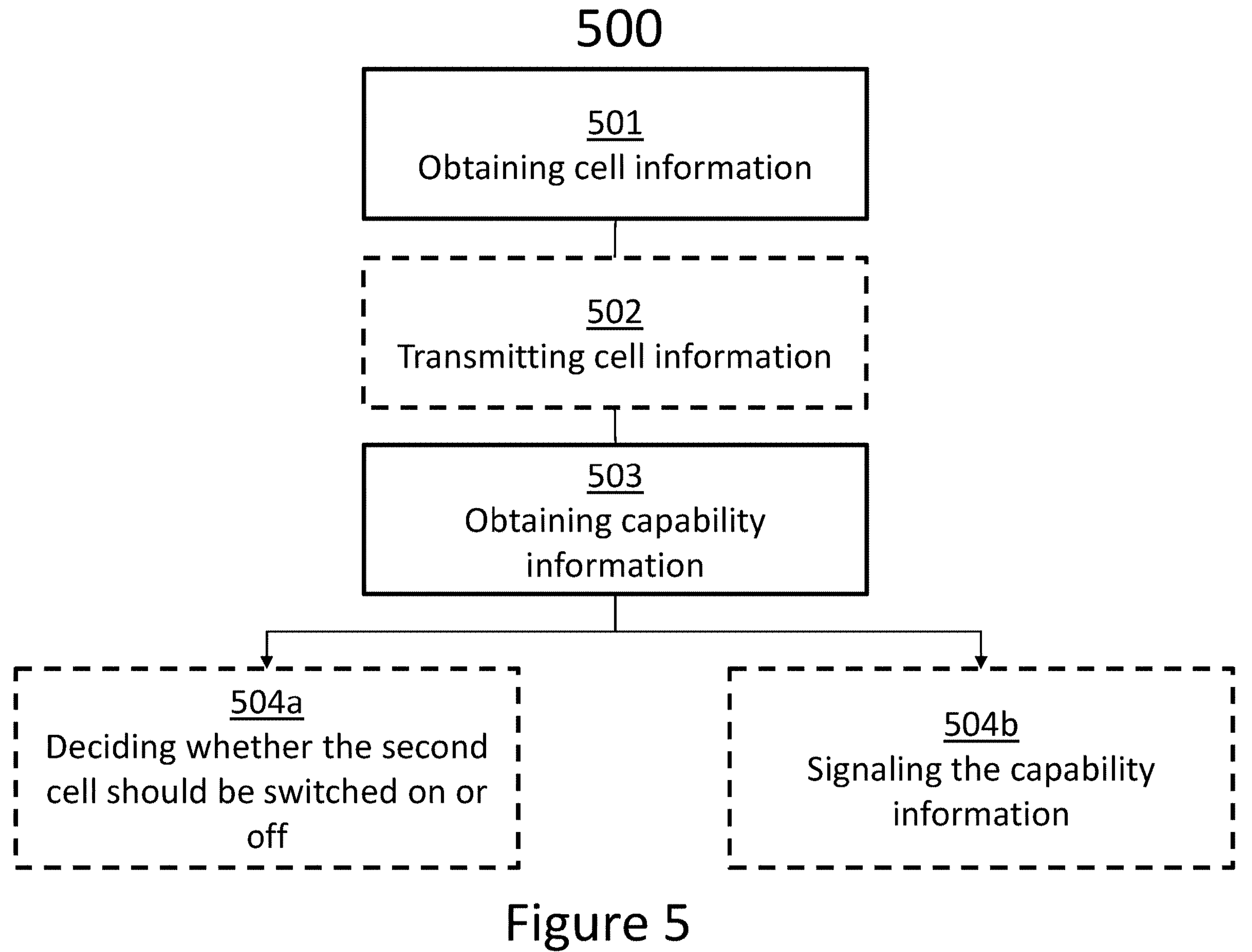
FIG. 5 is a flowchart illustrating a method at a first network node in accordance with some embodiments.

FIG. 5 is a flowchart illustrating a method 500. The method 500 may for example be performed by, or at, a first network node in a wireless communication system. The wireless communication system may comprise a wireless device. The method 500 may comprise obtaining 501 cell information indicating whether a second cell is switched off. The second cell may be associated with a second cell configuration. The method 500 may for example be performed by, or at, any of the network nodes 101*a-c*, 201, 301*a-b* shown in FIGS. 1-3, and it will be appreciated that some features and/or examples given in relation to FIGS. 1-3 may correspond to features, examples, and/or embodiments given in relation to method 500 of FIG. 5. The method 500 may be performed in cooperation with a wireless device performing the method 400, and therefore it will be appreciated that some features, examples, and/or embodiments may correspond to each other.

The obtaining 501 may for example involve obtaining the cell information from an internal memory, since the network node may have the cell information stored locally. This may be the case for instance if the first network node controls the switching on/off of the second cell and/or if the first network node operates the second cell. It will be appreciated that for example the network node 201 described in relation to FIG. 2, may already have access to the cell information of the second cell.

The obtaining 501 may for example involve receiving the cell information, for example from another network node, from the OSS, and/or from the Core Network (CN). This may be the case if another network node controls the switching on/off of the second cell and/or if the second cell is operated by another network node. The cell information obtained at step 501 may also be pre-configured at the first network node, such that the second cell may be pre-configured to be switched off at certain points in time. It will be appreciated that for example the first network node 101*a* described in relation to FIG. 1, may receive the cell information of the second cell from the second network node 101*b* or the third network node 101*c*.

The method 500 may further comprise obtaining 503 capability information. The capability information may indicate whether the wireless device supports the second cell configuration. The wireless device may be located in a first geographical area associated with a first cell. The first cell may be associated with a first cell configuration and the wireless device may support at least the first cell configuration.

In some embodiments, the first network node may operate the first cell. The method 500 may then further comprise transmitting 502, to the wireless device, the obtained cell information indicating whether the second cell is switched off. The obtaining 503 the capability information may in this case comprise receiving the capability information from the wireless device. It will be appreciated that when the method 500 is performed by, or at, for example the first network node 101*a* in FIG. 1 or the network node 201 in FIG. 2, the network node 101*a* or 201 may transmit 502 cell information to the wireless device 102 and obtain 503 the capability information by receiving it from the wireless device 102.

In some embodiments, another network node may operate the first cell. The method 500 may then further comprise transmitting 502, to the network node operating the first cell, the obtained cell information indicating whether the second cell is switched off. The cell information may be transmitted directly to the network node operating the first cell, or via a further network node. The network node operating the first cell may then transmit the cell information to, and may receive the capability information from, the wireless device. The obtaining 503 the capability information may in this case comprise receiving the capability information from another network node (for instance directly from the network node operating the first cell or via a further network node). It should be noted that the cell information and capability information may be represented differently depending on whether they are signaled between two network nodes, or between a network node and a wireless device. It will be appreciated that when the method 500 is performed by, or at, for example the second or third network node 101*b* or 101*c* in FIG. 1, then the network node 101*b* or 101*c* may transmit 502 the obtained cell information to the network node 101*a*. Further, the capability information may in the example of FIG. 1 be obtained by the network node 101*b* or 101*c* by receiving it from the network node 101*a*.

In some embodiments, obtaining 501 the cell information and obtaining 503 the capability information may be performed close in time, for instance both the cell information and the capability information may be obtained while the wireless device is located in the first geographical area. In another embodiment, these may be separated in time, for instance the cell information may be obtained 501 at one point in time, for instance before the wireless device is located in the first geographical area. Then, at a later point in time, the capability information may be obtained 503, for instance when the wireless device is located in the first geographical area.

The method 500 may further comprise one of two alternatives 504*a* or 504*b*. This may depend on whether the first network node is configured to decide whether the second cell is to be switched on/off.

In a first alternative, the method 500 may comprise deciding 504*a* whether the second cell is to be switched on or off. The decision 504*a* may be based on the obtained 501 cell information and the obtained 503 capability information. This may be the case for example when the first network node controls the switching on/off of the second cell and/or if the first network node operates the second cell. In the example given in relation to FIG. 2, the network node 201 may decide 504*a* whether the second cell 203*b* is to be switched on or off. Alternatively, the network node 201 may be controlled by another network node which may decide 504*a* whether the second cell 203*b* is to be switched on or off. In the example given in relation to FIG. 1, any of three network nodes 101*a-c* may be configured to decide 504*a* whether the second cell 103*b* is to be switched on or off.

In a second alternative, the method 500 may comprise signaling 504*b* the capability information (which was obtained at step 503) to a second network node for the second network node to decide whether the second cell is to be switched on or off. This may be exemplified in relation to FIG. 1, where the first network node 101*a* may signal 504*b* the capability information to any of the other network nodes (101*b* or 101*c*) for one of these network nodes (101*b* or 101*c*) to decide whether the second cell 103*b* is to be switched on or off. This may be the case for instance when the second network node controls the switching on/off of the second cell and/or when the second network node operates the second cell. In case the second network node controls the switching on/off but does not operate the second cell, the second network node may instruct the network node operating the second cell that the second cell should be switched on or off. This may be exemplified in relation to FIG. 1, where the third network node 101*c* may decide whether the second cell 103*b* is to be switched on/off. The third network node 101*c* may then instruct the second network node 101*b* whether the second cell 103*b* is to be switched on/off. The network node that operates the second cell may be the same (see for instance the example in relation to FIG. 2) or a different network node (see for instance the example in relation to FIG. 1) than the network node that operates the first cell.

In some embodiments, the first network node referred to in the method 500 may control the switching on or off of the second cell. In this case, the first network node may be responsible for deciding 504*a* whether the second cell is to be switched on/off. If the second cell is switched off while the wireless device supports the second cell configuration, the wireless device may at some point want to handover to and/or reselect the second cell, which may not be possible unless the second cell is switched on. Therefore, in some examples, the first network node may decide 504*a* that the second call may be switched on in case the obtained 501 cell information indicates that the second cell is switched off, and the obtained 503 capability information indicates that the wireless device supports the second cell configuration.

In some embodiments a second network node may control the switching on or off of the second cell referred to in the method 500. In this case, the first network node may signal 504*b* the capability information to the second node. If the second cell is switched off while the wireless device supports the second cell configuration, the wireless device may at some point want to handover to and/or reselect the second cell, which may not be possible unless the second cell is switched on. Therefore, in some examples, the capability information may be signaled 504*b* to the second network node in response to that the obtained 501 cell information indicates that the second cell is switched off, and the obtained 503 capability information indicates that the wireless device supports the second cell configuration.

In some embodiments, the deciding 504*a* whether the second cell is to be switched on or off, or the signaling 504*b* the capability information to the second network node, may be based on a condition. The condition may include one or more parts which may be referred to as sub-conditions. If the condition includes multiple sub-conditions, all those sub-conditions should apply in order for the related action to be performed. It may only be relevant to decide 504*a* whether the second cell is to be switched on or off, or to signal 504*b* the capability information, in case the wireless device may access the second cell. Therefore, it may not be relevant to perform any action for example in case the wireless device does not support the second cell configuration. On the other hand, it may be relevant to act in case the likelihood of the wireless device moving to the second cell is high. Once the network is made aware of that the wireless device is located within the first geographical area and the network is made aware of the wireless device's capabilities, the network may use this information to decide 504*a* whether the second cell should be switched on, or to signal 504*b* the capability information.

It will be appreciated that the condition optionally employed in the method 500 for the step 504*a* or 504*b* may in some cases be based on an estimation, a determination and/or a measurement performed by the wireless device and/or the network node. The condition may for instance be checked based on measurements of signaling from the first network node and/or measurements on signaling from other network nodes. The condition may for instance be checked based on measurements of signaling from the wireless device. The method 500 may therefore further involve receiving, determining, estimating, and/or measuring in order to determine whether the condition is fulfilled. Further, the method 500 may also involve receiving measurement reports from the wireless device, such that the network node may use this information along with the obtained 501 cell information and the obtained 503 capability information to for example decide whether the second cell should be switched on/off.

In some examples, the condition optionally employed in the method 500 for the step 504*a* or 504*b* may include that the wireless device is predicted to move to a geographical area associated with the second cell. The method 500 may further involve predicting that the wireless device may move to the geographical area associated with the second cell. The prediction may be based on historical data, such as for example previous behavior of the wireless device and/or other wireless devices. The prediction may involve receiving signaling from the wireless device and or performing measurements on signaling from the wireless device. The geographical area associated with the second cell may be close to the first geographical area, for example partly overlapping, neighboring, or in proximity. Alternatively, the geographical area associated with the second cell may be located a certain distance from the first geographical area. In this case the wireless device may be predicted to move to the geographical area associated with the second cell.

In some examples, the condition optionally employed in the method 500 for the step 504*a* or 504*b* may include that there is a geographical area in which the wireless device is not supported if the second cell is switched off. The geographical area may only be covered by the second cell, or it may be covered by other cells with other cell configurations that the wireless device does not support. For example, if the second cell is switched off, the wireless device will lose coverage if moving to this geographical area.

In some examples, the condition optionally employed in the method 500 for the step 504*a* or 504*b* may include that the wireless device is close to a cell edge of the first cell. This may imply that the wireless device will soon move from the first geographical area and may need to handover for example to the second cell. It will be appreciated that there are several ways of determining whether the wireless device is close to a cell edge of the first cell.

In some examples, the condition optionally employed in the method 500 for the step 504*a* or 504*b* may include that the wireless device is moving with a velocity above a velocity threshold. This may imply that the wireless device will soon move from the first geographical area and may need to handover for instance to the second cell. It will be appreciated that there are several ways of estimating the velocity of the wireless device.

In some examples, the condition optionally employed in the method 500 for the step 504*a* or 504*b* may include that the wireless device was switched off within a time period. Before the wireless device is switched off, the wireless device may trigger a signaling procedure such as for example a detach procedure. If the first network node detects that the wireless device has recently switched off, this may imply that the wireless device may be switched on soon. Hence, the network node may know that there may be a wireless device present in the first cell, it may also have access to its capabilities. The network node may not be able to know when this wireless device may be switched on again, or at what location. This location may be outside the first geographical area for example within the second cell. In this case, the wireless device may not be able to connect to the network if the second cell is switched off.

In some examples, the condition optionally employed in the method 500 for the step 504*a* or 504*b* may include that a third cell, associated with a third cell configuration, is switched off. If for instance both the second and the third cell is switched off, and the wireless device does not support any other cell in a geographical area covered by both the second and the third cell, this may imply that the second cell (or the third cell) may be switched on. In some examples, the second cell may be switched off while the third cell may for instance go into an unexpected outage, for instance due to a software or hardware issue. In this case, the second cell may be switched on to assist the wireless devices which were supposed to communicate with the third cell.

In some examples, the condition optionally employed in the method 500 for the step 504*a* or 504*b* may include that a radio coverage hole exists in the first cell. This may imply that the wireless device will lose coverage to the first cell and may need to handover for example to the second cell. The first network node may detect that within the outer boundaries of the first geographical area there is a region where there is no coverage from the first cell. The detection may be based on previous measurements or measurements reports (for example a Minimization of Driving Test (MDT)). In the example given in relation to FIG. 2, the network node 201 may detect that there is an area within the outer boundaries of the first cell 203*a* which the signaling from the first cell 203*a* does not cover. In that case, the network node 201 may switch on the second cell 203*b* to support wireless devices in that area.

In some examples, the condition optionally employed in the method 500 for the step 504*a* or 504*b* may include that a number of wireless devices that supports the second cell is below a threshold. If there are too few wireless devices which support the second cell, for instance by supporting the second cell configuration, this may imply that the second cell may be switched off. If there instead are many wireless devices which supports the second cell, this may imply that the second cell should be switched on.

In some examples, the condition optionally employed in the method 500 for the step 504*a* or 504*b* may include that the second cell belongs to a first Public Land Mobile Network, PLMN, which is a border cell to a second PLMN. A border cell may mean that any roamer wireless device could access the border cell. As a way of example, suppose that the second cell is a cell located at an airport or at a border between two different wireless networks. If such border cell is switched off it may cause an issue for arriving roaming subscribers supporting the second cell configuration, which may imply that the second cell should be switched on.

In some embodiments, the first network node referred to in the method 500 may comprise one or more base stations. The first network node may comprise a first base station which operates the first cell according to the first cell configuration. The first network node may comprise a second base station which operates the second cell according to the second cell configuration. The first network node may comprise both the first and second base station. The first network node may communicate with other network nodes in the wireless communication network.

In another embodiment, the first network node referred to in the method 500 may not comprise any base station but may communicate with the network node(s) comprising the first and/or second base stations.

In some embodiments, the first network node referred to in the method 500 may comprise a control unit. The control unit may control switching on/off the second cell. The first network node may for example comprise a control unit and one or more base stations each operating a corresponding cell. The first network node may comprise a control unit and may for example communicate with one or more network nodes operating the first and/or second cell.

A wireless device configured for operation in a wireless communication network is disclosed. The wireless device may be implemented as a user equipment or a terminal. The wireless device may comprise, and/or be adapted to utilize, processing circuitry and/or radio front-end circuitry, in particular a transceiver and/or transmitter and/or receiver, communicating with one or more network node(s). The wireless device may be configured to perform the method 400 at the wireless device as described above. The processing circuitry of the wireless device may be configured to cause the wireless device to perform the method 400 at the wireless device as described above. Examples of the wireless device include the wireless device 102 in FIGS. 1-3 and the wireless devices QQ110, QQ110*b* and QQ110*c* in FIG. 6.

A network node configured for operation in a wireless communication network is disclosed. The network node may comprise, and/or be adapted to utilize, processing circuitry and/or radio front-end circuitry, in particular a transceiver and/or transmitter and/or receiver, for communicating with a wireless device and/or other network node (s). The network node may be configured to perform the method 500 at the first network node as described above. The processing circuitry may be configured to cause the network node to perform the method 500 at the first network node as described above. Examples of the network node include the network nodes 101*a*-101*c* in FIG. 1, the network node 201 in FIG. 2, the network nodes 301*a*-301*b* in FIG. 3, and the network nodes QQ160 and QQ160*b* in FIG. 6.

Figure 6:
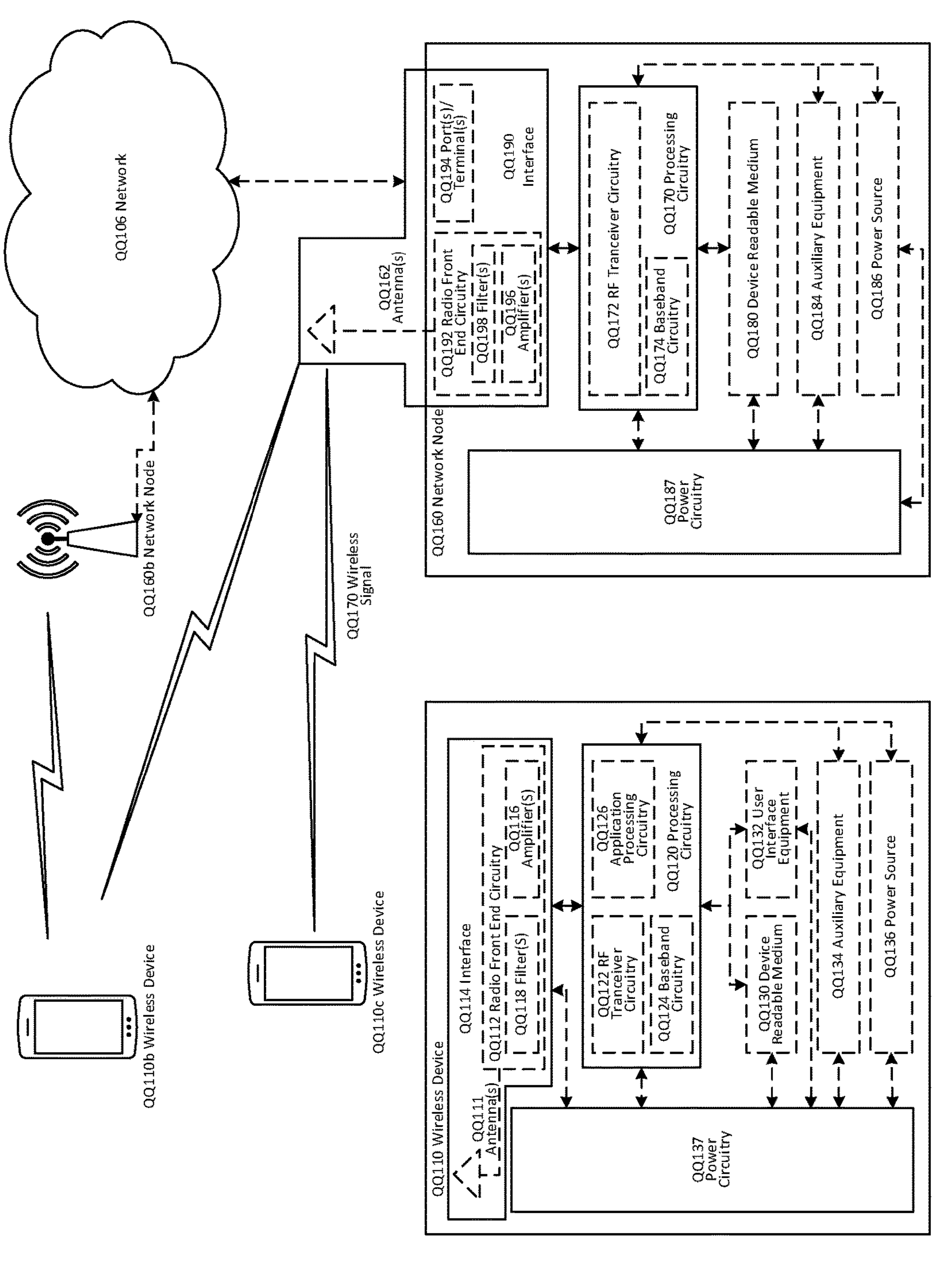
FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs).

Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and an RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 6 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IOT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IOT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments. WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130. WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments. RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments. RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc.

The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 7:
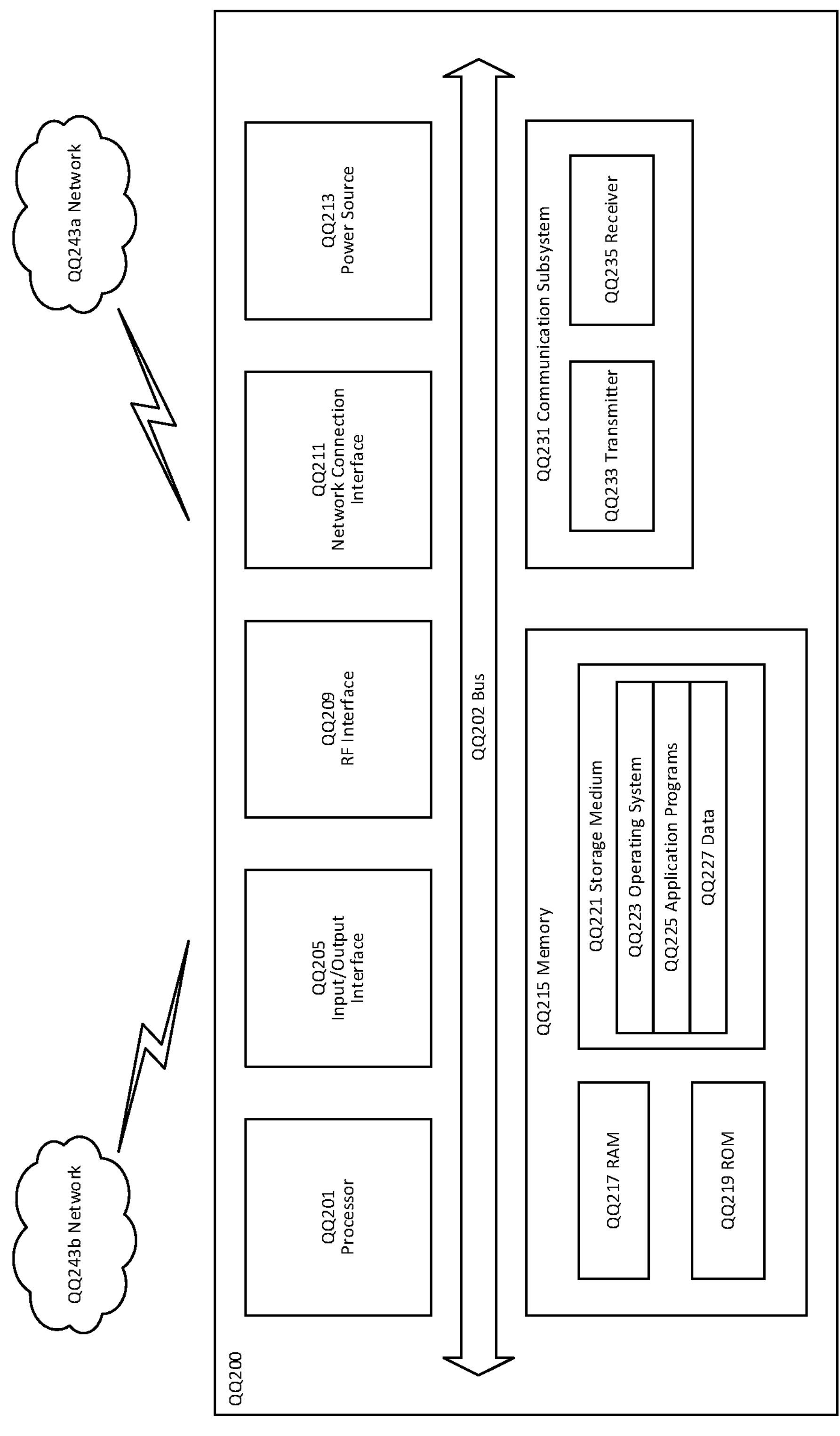
FIG. 7 illustrates a user equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IOT UE, a machine type communication (MTC) UE, and/or an enhanced MTC (eMTC) UE. UE QQ200, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof.

Storage medium QQ221 includes operating system QQ223, application program QQ225, and data QQ227. In other embodiments, storage medium QQ221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP. SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 7, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 8:
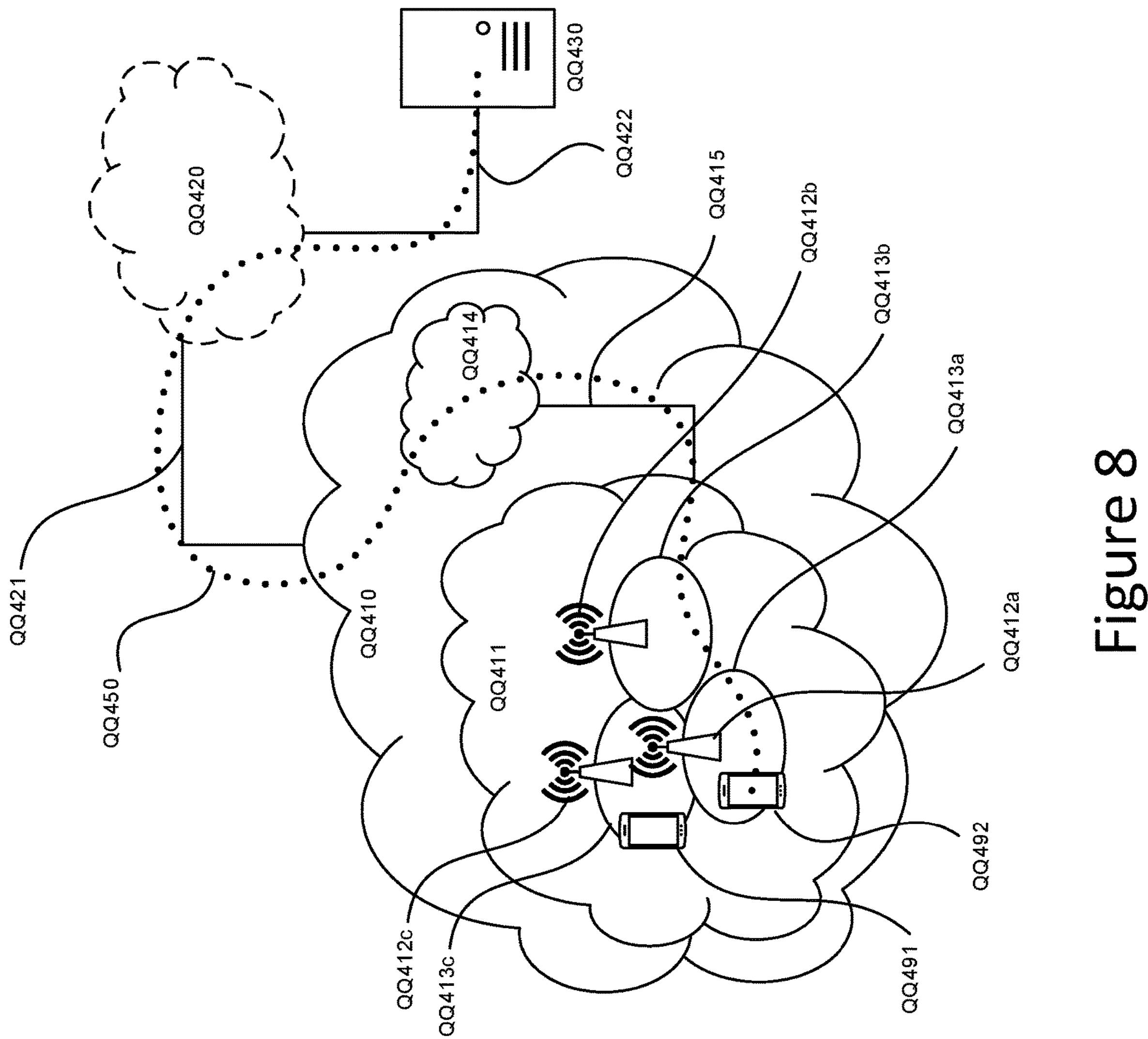
FIG. 8 illustrates a telecommunication network connected via an intermediate network to a host computer in accordance with some embodiments.

With reference to FIG. 8, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 8 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 9). In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 9) served by base station QQ520.

Communication interface QQ526 may be configured to facilitate connection QQ560 to host computer QQ510. Connection QQ560 may be direct or it may pass through a core network (not shown in FIG. 9) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 9:
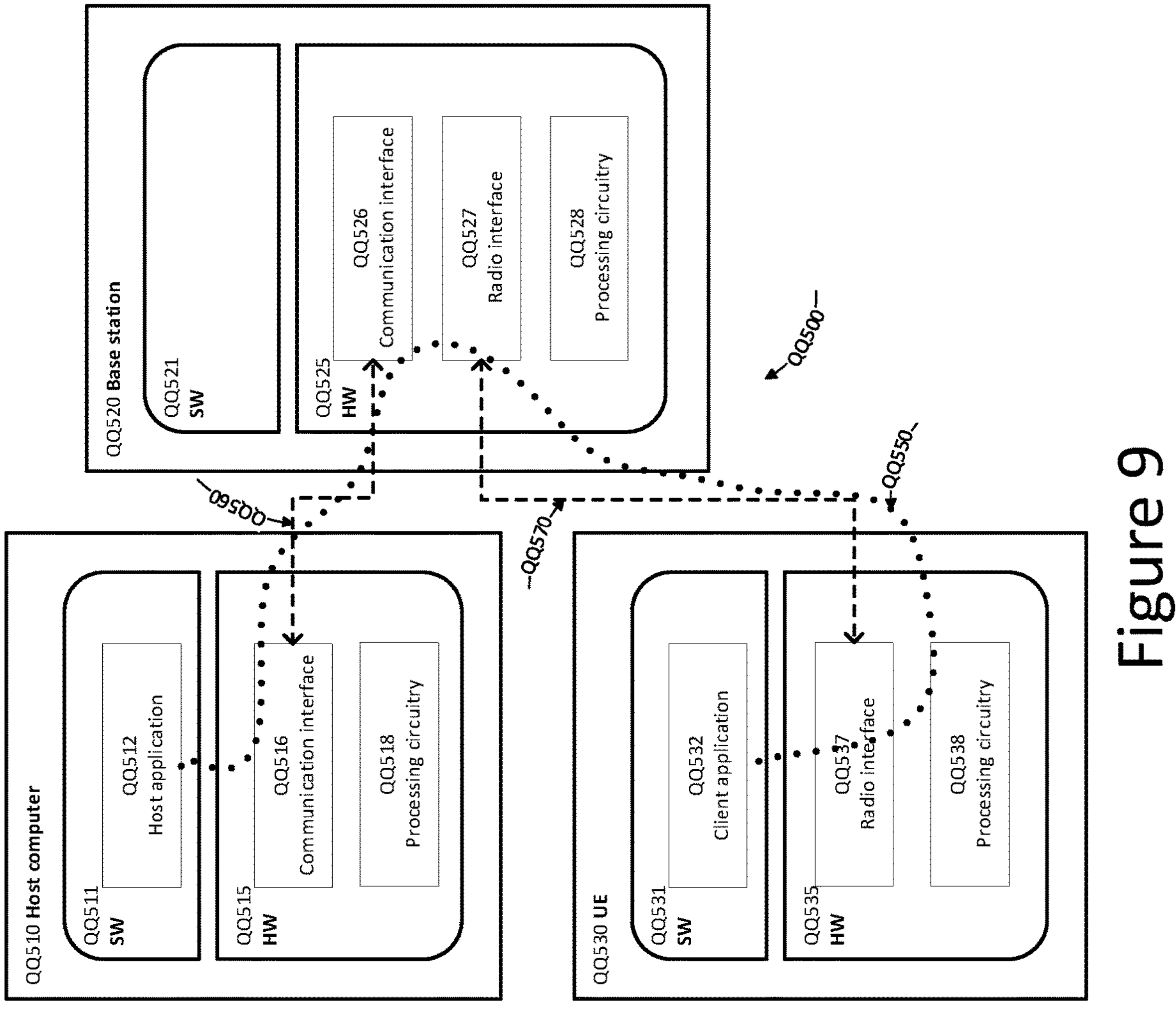
FIG. 9 illustrates a host computer communicating via a base station with a user equipment over a partially wireless connection in accordance with some embodiments.

It is noted that host computer QQ510, base station QQ520 and UE QQ530 illustrated in FIG. 9 may be similar or identical to host computer QQ430, one of base stations QQ412*a*, QQ412*b*, QQ412*c* and one of UEs QQ491, QQ492 of FIG. 8, respectively. This is to say, the inner workings of these entities may be as shown in FIG. 9 and independently, the surrounding network topology may be that of FIG. 8.

In FIG. 9, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may allow better connectivity for the wireless devices.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511. QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy messages' using OTT connection QQ550 while it monitors propagation times, errors etc.

Figure 10:
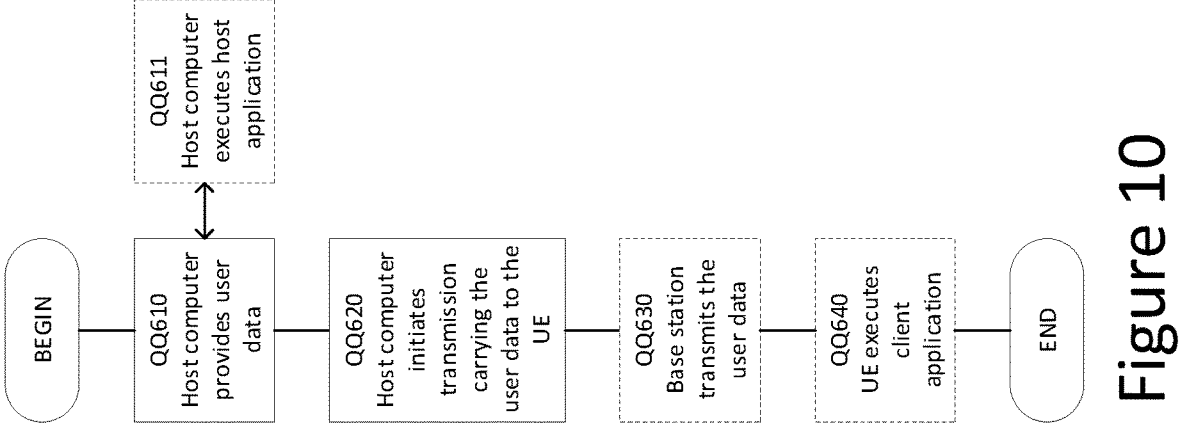
FIGS. 10-13 are flowcharts illustrating methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 10 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 11:
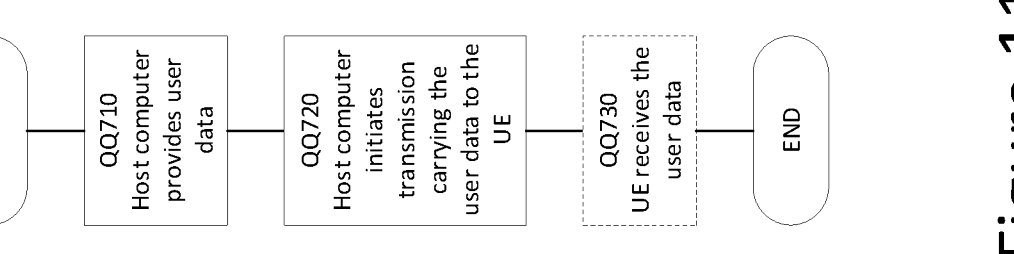

FIG. 11 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 11 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 12:
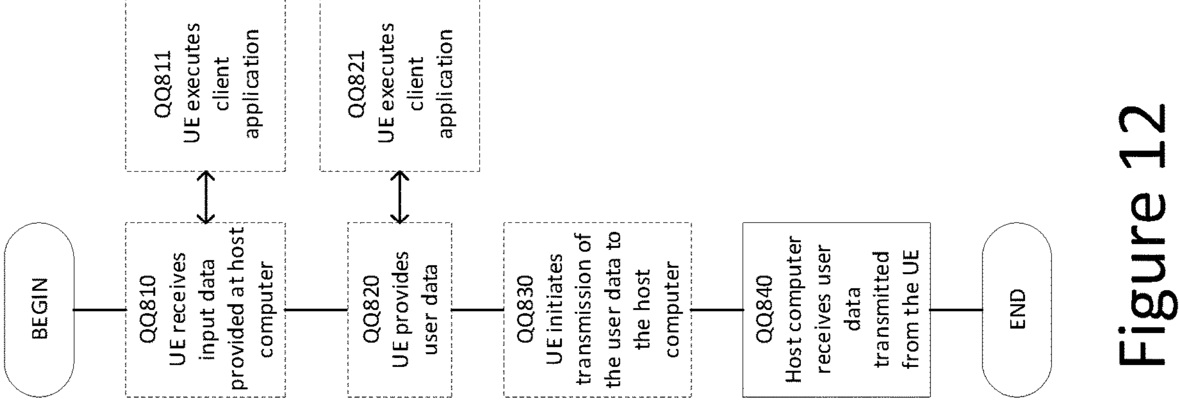

FIG. 12 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 12 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 13:
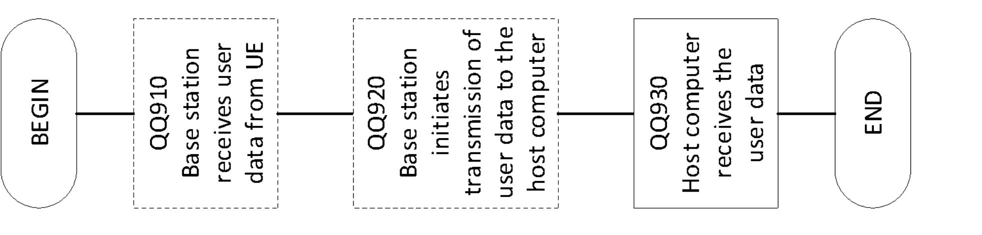

FIG. 13 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 13 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQ Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MTC Machine Type Communication
cMTC critical MTC
eMTC enhanced MTC
mMTC massive MTC
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TA Timing Advance
TDD Time Division Duplex
TDOA Time Difference of Arrival
TOA Time of Arrival
TOF Time of Flight
TSN Time Sensitive Networking
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method at a wireless device in a wireless communication network, wherein the wireless device is located in a first geographical area associated with a first cell, wherein the first cell is operated by a first network node according to a first cell configuration, wherein the wireless device supports at least the first cell configuration, the method comprising:

receiving, from the first network node, cell information indicating whether a second cell is switched off, wherein the second cell is associated with a second cell configuration, and transmitting, to the first network node, capability information indicating whether the wireless device supports the second cell configuration, wherein the capability information further indicates that there is at least a portion of the second geographical area in which the wireless device does not support a cell configuration of any cell that is switched on in the wireless communication network.

2. The method of claim 1, wherein the capability information is transmitted by the wireless device for assisting the first network node or a second network node in deciding whether the second cell is to be switched on or off.

3. The method of claim 1, wherein the capability information is transmitted in response to that:

the cell information indicates that the second cell is switched off and the wireless device supports the second cell configuration.

4. The method of claim 1, wherein the second cell is associated with a second geographical area, wherein the cell information indicates that the second cell is switched off, and wherein the capability information indicates that the wireless device supports the second cell configuration.

5. The method of claim 1, wherein the capability information is transmitted based on a condition, wherein the condition includes one or more of that:

the cell information is received, the wireless device is close to a cell edge of the first cell, a signal level of the first cell is below a threshold, a signal level of the second cell is above a threshold, a signal level of a third cell is above a threshold, the wireless device is moving towards, or is predicted to move to, a geographical area associated with the second cell, and the wireless device is moving with a velocity above a velocity threshold.

6. The method of claim 1, wherein the capability information is transmitted during:

a Tracking Area Update (TAU), or a call setup procedure, or a modified call setup procedure, wherein the modified call setup procedure is a call setup procedure which is aborted after the capability information is transmitted.

7. The method of claim 1, wherein the cell information indicates that a set of cells is switched off, wherein the set of cells includes the second cell.

8. The method of claim 1, wherein the cell information comprises at least one indicator, wherein the indicator indicates whether a cell, or one or more cells associated with a certain cell configuration, is switched off.

9. A method at a first network node in a wireless communication network, wherein the wireless communication network comprises a wireless device, the method comprising:

obtaining cell information indicating whether a second cell is switched off, wherein the second cell is associated with a second cell configuration, and obtaining capability information indicating whether the wireless device supports the second cell configuration, wherein the wireless device is located in a first geographical area associated with a first cell, wherein the first cell is associated with a first cell configuration, wherein the wireless device supports at least the first cell configuration, wherein the capability information indicates that there is at least a portion of a second geographical area in which the wireless device does not support a cell configuration of any cell that is switched on in the wireless communication network, and wherein the method further comprises:

deciding whether the second cell is to be switched on or off based on the obtained cell information and the obtained capability information, or signaling the capability information to a second network node for the second network node to decide whether the second cell is to be switched on or off.

10. The method of claim 9, wherein the first network node controls the switching on or off of the second cell, and wherein deciding whether the second cell is to be switched on is performed in response to that:

the cell information indicates that the second cell is switched off, and the capability information indicates that the wireless device supports the second cell configuration.

11. The method of claim 9, wherein the second network node controls the switching on or off of the second cell, and wherein signaling the capability information to the second network node is performed in response to that:

the cell information indicates that the second cell is switched off, and the capability information indicates that the wireless device supports the second cell configuration.

12. The method of claim 9, wherein deciding whether the second cell is to be switched on or off or signaling the capability information to the second network node is based on a condition, wherein the condition includes one or more of that:

the wireless device is moving towards, or is predicted to move to, a geographical area associated with the second cell, the wireless device is close to a cell edge of the first cell, the wireless device is moving with a velocity above a velocity threshold, the wireless device was switched off within a time period, a third cell, associated with a third cell configuration, is switched off, a radio coverage hole exists in the first cell, a number of wireless devices that supports the second cell is below a threshold, or the second cell belongs to a first Public Land Mobile Network (PLMN), which is a border cell to a second PLMN.

13. The method of claim 9, wherein the first network node operates the first cell, wherein the method further comprises:

transmitting, to the wireless device, the obtained cell information indicating whether the second cell is switched off, and wherein obtaining the capability information comprises:

receiving the capability information from the wireless device.

14. The method of claim 9, wherein the first network node comprises:

one or more base stations operating the first cell and/or the second cell, and/or a control unit, wherein the control unit controls switching on/off the second cell.

15. The method of claim 9, wherein the cell information indicates that a set of cells is switched off, wherein the set of cells includes the second cell.

16. The method of claim 9, wherein the cell information comprises at least one indicator, wherein the indicator indicates whether a cell, or one or more cells associated with a certain cell configuration, is switched off.

17. The method of claim 16, wherein the cell information comprises at least one cell identifier, wherein each cell identifier identifies a cell which is switched off.

18. A wireless device configured for use in a wireless communication network, wherein the wireless device is configured for use in a first geographical area associated with a first cell operated by a first network node according to a first cell configuration, wherein the wireless device is configured to support at least the first cell configuration, the wireless device comprising:

processing circuitry configured to:

receive, from the first network node, when the wireless device is located in the first geographical area, cell information indicating whether a second cell is switched off, wherein the second cell is associated with a second cell configuration, and transmit, to the first network node, when the wireless device is located in the first geographical area, capability information indicating whether the wireless device is configured to support the second cell configuration, wherein the capability information further indicates that there is at least a portion of a second geographical area in which the wireless device does not support a cell configuration of any cell that is switched on in the wireless communication network.

19. A network node configured for use in a wireless communication network, wherein the wireless communication network comprises a wireless device for use in a first geographical area associated with a first cell, wherein the first cell is associated with a first cell configuration, and wherein the wireless device is configured to support at least the first cell configuration, the network node comprising:

processing circuitry configured to:

obtain cell information indicating whether a second cell is switched off, wherein the second cell is associated with a second cell configuration, and obtain, when the wireless device is located in the first geographical area, capability information indicating whether the wireless device is configured to support the second cell configuration, wherein the capability information further indicates that there is at least a portion of a second geographical area in which the wireless device does not support a cell configuration of any cell that is switched on in the wireless communication network, wherein the processing circuitry is further configured to:

decide whether the second cell is to be switched on or off based on the obtained cell information and the obtained capability information, or signal the capability information to a second network node for the second network node to decide whether the second cell is to be switched on or off.

* * * * *